F. P. MURPHEY.
DIFFERENTIAL DROPPING MECHANISM.
APPLICATION FILED NOV. 3, 1908.
960,187.
Patented May 31, 1910.
3 SHEETS—SHEET 1.
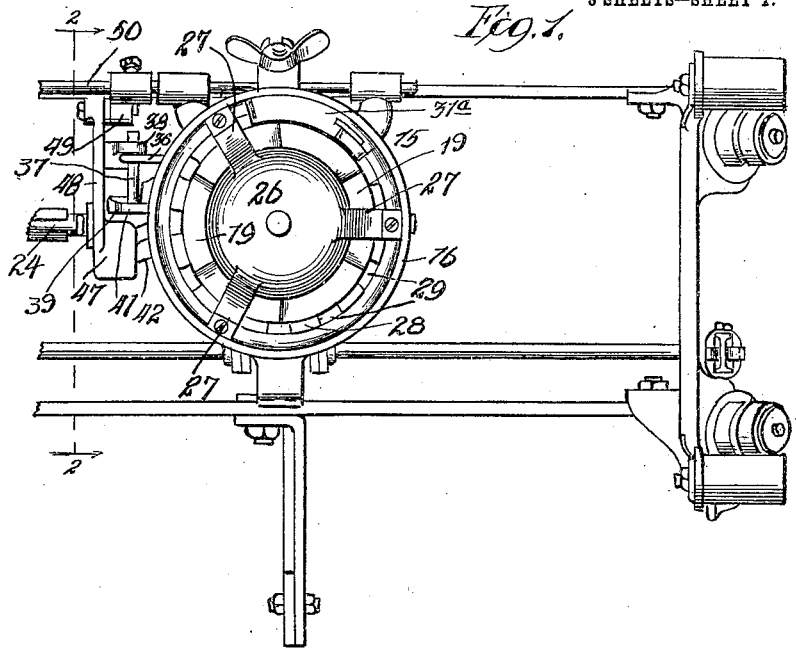
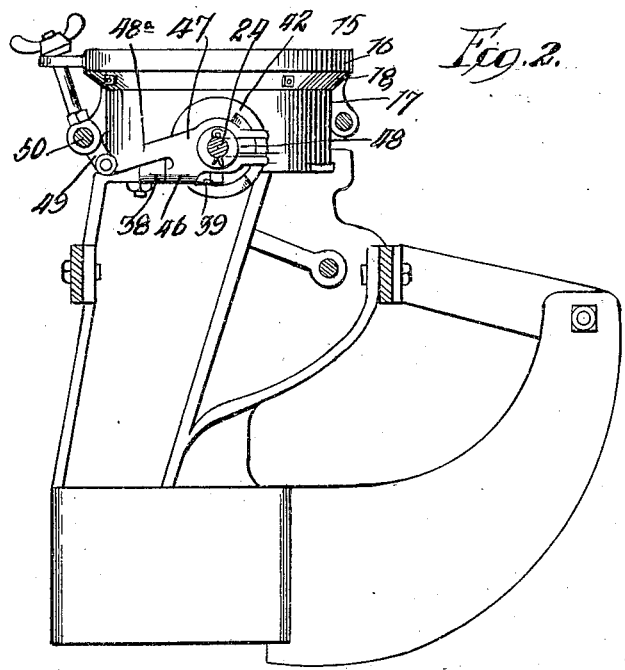
Witnesses:
Inventor:
Frank P. Murphey

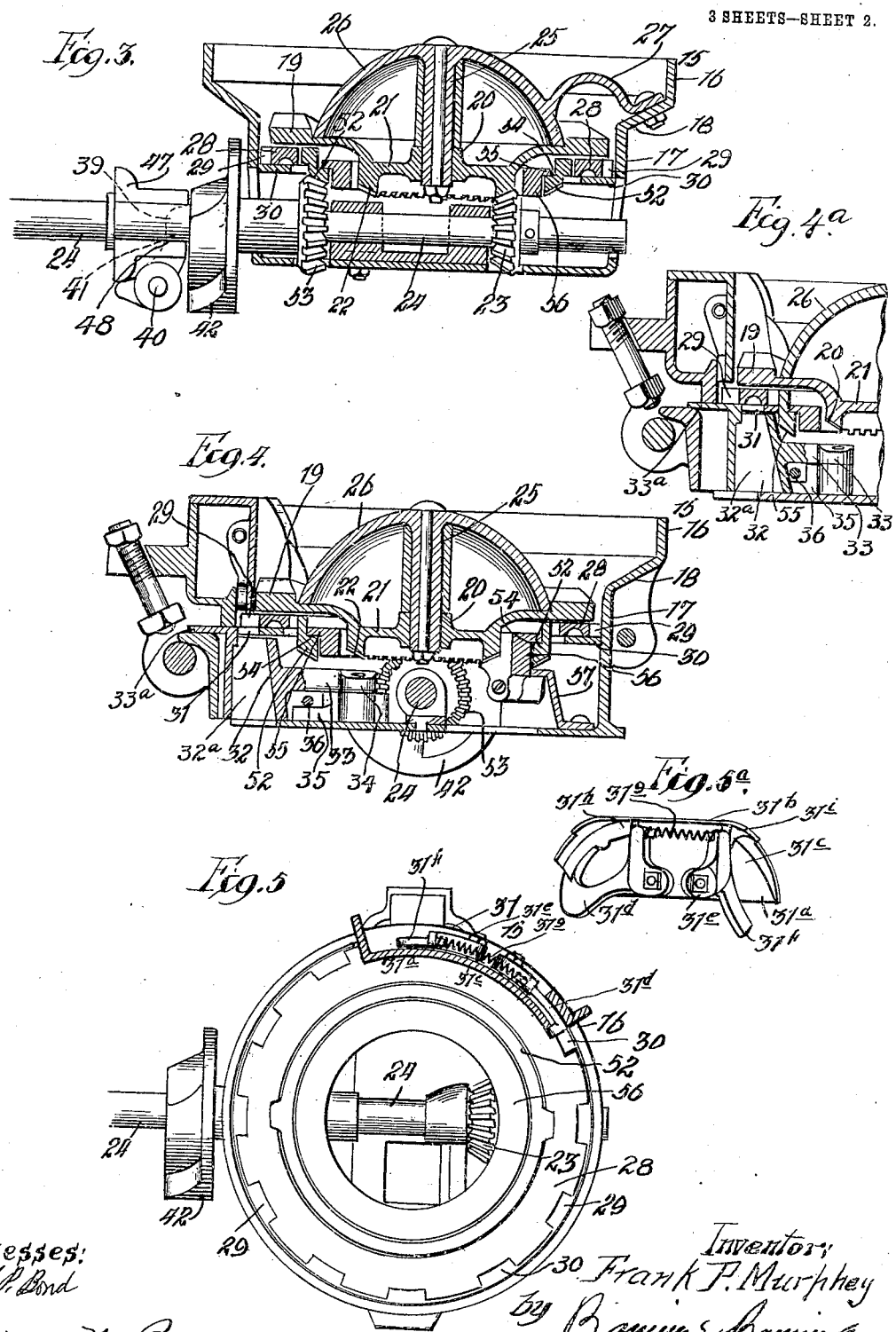

F. P. MURPHEY.
DIFFERENTIAL DROPPING MECHANISM.
APPLICATION FILED NOV. 3, 1908.
960,187.
Patented May 31, 1910.
3 SHEETS—SHEET 3.
Fig. 6.
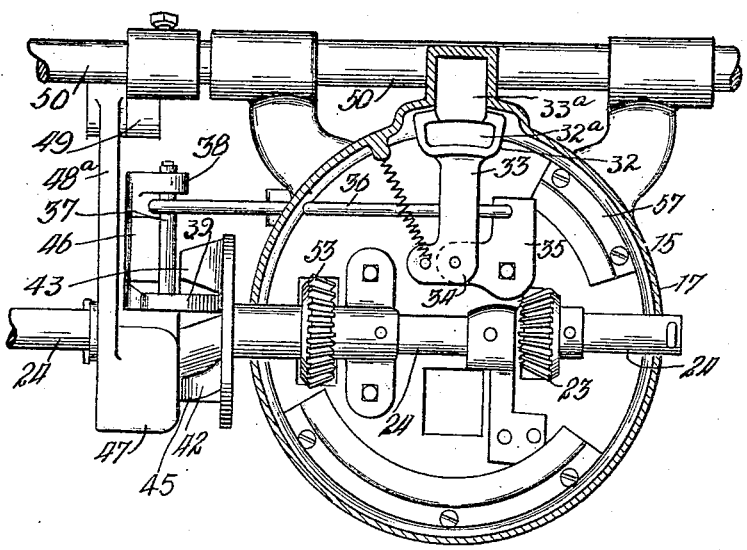
Fig. 7.
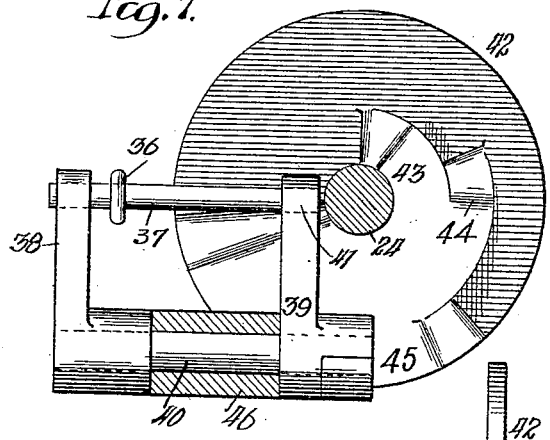
Fig. 8.
Witnesses:
Inventor:
Frank P. Murphey
by
Att'ys

UNITED STATES PATENT OFFICE.

FRANK P. MURPHEY, OF DECATUR, ILLINOIS.

DIFFERENTIAL DROPPING MECHANISM.

960,187.  Specification of Letters Patent.  Patented May 31, 1910.

Application filed November 3, 1908. Serial No. 460,954.

*To all whom it may concern:*

Be it known that I, FRANK P. MURPHEY, a citizen of the United States, residing at Decatur, in the county of Macon and State of Illinois, have invented certain new and useful Improvements in Differential Dropping Mechanism, of which the following is a specification.

This invention relates more particularly to the differential dropping mechanism used with corn planters for regulating the supply of corn to the valve; and to the agitator for delivering the corn from the hopper to the differential dropper.

The dropping mechanism has for its particular object, to regulate the number of kernels intermittently dropped, and to permit of the regulation of the discharge by the manipulation of suitable mechanism within the control of the operator.

The agitator has for its particular object, to stir up the bulk of corn contained within the hopper and deliver the kernels on edge into position to be carried around by the pocketed cut-off plate to the discharge outlet.

Further objects of the invention are, to so construct and arrange the various operating portions of the machine, with respect to one another and with respect to the frame of the machine, that the entire mechanism will be rigidly held and supported in compact relation and in position to perform the functions intended, and at the same time permit of suitable manipulation on the part of the operator to regulate and control the various operations of the differential dropping mechanism.

Further objects will appear from a detailed description of the invention, which consists in the features of construction and combination of parts hereinafter described and claimed.

In the drawings, Figure 1 is a top or plan view of a portion of the frame of a corn planter, showing the revoluble cut-off plate and adjacent portions of the differential dropping mechanism; Fig. 2 a side elevation, taken on line 2—2 of Fig. 1, looking in the direction of the arrow; Fig. 3 a sectional elevation, taken through the dropper and agitator; Fig. 4 a similar view, at right angles to the section of Fig. 3; Fig. 4ª a detail, showing the slide plate in its retracted or acting position; Fig. 5 a top or plan view of the pocketed cut-off plate; Fig. 5ª a rear face view of the cut-off knocker or ejector; Fig. 6 a top or plan view of the cut-off slide, the differential cam, and adjacent mechanism; Fig. 7 a face view of the differential cam for actuating the cut-off slide; and Fig. 8 an edge view of the same.

Referring now to Fig. 1, 15 indicates the dropper casing which is suitably located in the machine, and is adapted to have a hopper, not shown, superimposed thereon. The dropper casing is of circular formation, comprising an upper cylindrical wall 16, a lower cylindrical wall 17 of reduced diameter, and a connecting sloping wall 18. Located inside of the lower wall is a revoluble agitator 19, the edge of the rim of which lies in close proximity to the surrounding wall, leaving only sufficient space for the edgewise entrance of the kernels of corn thereinto. The teeth on the upper surface of the agitator are sloped toward the periphery and serve to feed the corn outwardly toward the slot and in edgewise relation thereto. The agitator further comprises a hub 20 which is connected with the rim by means of a shouldered web 21, and the web has formed, on its under surface, a beveled gear 22 which meshes with a bevel pinion 23 mounted on an intermittently rotated shaft 24. The hub 20 is rotatably mounted on a stem 25 which depends from the center of an inverted cup 26, which cup occupies the center of the dropper casing and serves to deflect the kernels of grain toward the periphery of the agitator in position to be discharged therefrom into the surrounding annular space. The cup is suspended by means of a plurality of bracket arms 27, bolted or otherwise secured to the oblique wall 18 of the casing. Immediately below the agitator is a dropper plate 28, provided with pockets 29 in the form of notches cut in the periphery of the plate. The notched periphery of the plate is of sufficient diameter to project outwardly from the edge of the agitator, in position to receive into the pockets the kernels of grain which are passed edgewise through the space afforded. Below the dropper plate is a ring 30 which serves to support the grain submitted to the pockets, save only at the point of discharge where the ring is provided with a discharge outlet 31, as shown in Fig. 4.

In order to shield the discharge opening from the column of grain supported in the hopper, a shield plate 31ª is provided, which, as shown, is of angle formation comprising a top wall or shelf 31ᵇ and a vertical rounded wall 31ᶜ, which latter closely encircles the periphery of the agitator. The shield has pivoted thereto, at one end, a cut-off member 31ᵈ of bell crank formation, which is pivoted to the plate in position to bring its active end into engagement with the dropper plate, allowing the kernels of corn contained in the cells or pockets thereof to ride under the end of the cut-off member, whereby the ingress of additional kernels from the bulk of grain above will be prevented and wedging avoided.

The shield plate, near its apposite end, has pivoted thereto a knocker or ejector 31ᵉ of substantially T formation, the lower end of which constitutes a finger 31ᶠ, which rides on top of the seed plate and is adapted to be projected into and through the cells or pockets thereof when brought into register, in order to knock out and discharge the kernels of grain carried thereby. In order to hold the cut-off member and the knocker in yielding operative position, a coil spring 31ᵍ is interposed between the upper ends of the two members; and, in order to limit the downward projection of the two members, abutments 31ʰ and 31ⁱ are formed on the vertical wall of the shield plate in position to engage the cut-off and the knocker, respectively. The provision of an abutment for the cut-off member is especially important, in order to prevent the active end of the cut-off member being jammed down into the cells or pockets as the same are brought into register therewith.

The outlet is controlled by means of a slide plate 32 which consists of a central elongated chute or passage 32ª, the upper edge of which lies adjacent to the ring 30, the discharge outlet 31 of the ring and the chute or passage 32ª being in alinement when the chute is thrown forward. Extending rearwardly from the chute is an L-shaped arm 33, and extending forwardly from the chute is a plate or tongue 33ª, the top face of which is flush with the top edge of the chute. When the chute is drawn back, this plate will lie underneath the discharge outlet 31 and prevent grain from falling into the chute or passageway 32ª. The movement of the chute being controlled by the differential dropping mechanism, it can be moved so as to allow one, two or three grains to drop into the chute at predetermined times.

The arm 33, at its elbow 34, is pivoted to a bell crank lever 35, the opposite end of which is connected by means of a rod 36, and the opposite end of the rod is pivoted to a pin 37 carried by bracket arms 38 and 39, which bracket arms are mounted to swing upon a pivot shaft 40, best shown in Fig. 7. The bracket arm 39 is provided, on its forward side, with an inwardly extending dog 41 which is adapted to engage a cam disk 42 mounted upon the shaft 24. The cam disk is provided with concentric cam elevations 43, 44 and 45, of differing lengths, and the dog and connecting parts are adapted to be moved radially with respect to the cam disk to bring the dog into position to be engaged by any one of the three cam elevations, whereby the frequency of movement of the cut-off slide can be adjusted at the will of the operator. In this manner the device can be regulated to operate the cut-off slide with each passage of a pocket over the discharge opening, or with every other passage, or with every third passage, thereby giving three variations in the discharge of the grain. The pivot shaft 40 is entered through a bracket arm 46 which depends from an adjustable plate 47, which plate is provided with a slot 48 which embraces the shaft 24, as shown in Fig. 2, and permits the plate to be moved back and forth upon the shaft as a bearing for regulating the position of the dog 41 with respect to the center of the cam disk. The plate 47 is provided with an outwardly projecting arm 48ª which is pivoted to a crank 49 carried by a rock shaft 50 which is adapted to be actuated by means of a hand lever of any suitable type.

The pocket or dropper plate 28, which is of ring formation, surrounds a gear ring 52, with which it is connected, which gear ring meshes with a bevel pinion 53 mounted upon the shaft 24. The gear ring is shouldered on its inner edge 54 to receive a flange 55 on a bearing ring 56, which is suitably supported by a plurality of legs 57 connected to the floor of the casing, as shown in Fig. 4. This arrangement of bevel pinions causes the agitator and dropper plates to revolve in opposition to one another, which is desirable in that it causes the teeth on the face of the agitator plate to move past the pockets on the adjacent dropper plate, although the same result could be secured by so positioning and proportioning the gears that the two devices would move in the same direction but at different speeds.

In use, the corn within the hopper rests upon the toothed upper face of the agitator, being fed down toward the periphery of the casing by the concave walls of the inverted cup 26. As the agitator is revolved in opposition to the pocketed dropper plate, the kernels of corn will be dropped edgewise into the narrow space intermediate the periphery of the agitator and surrounding wall of the casing, and in this position will be fed into the pockets from the dropper plate and carried around thereby until they are brought into register with the discharge passage, the opening through which is regulated by the intermittently movable slide plate 32. The frequency of movement of the slide plate will regulate the amount of corn discharged, its movements being proportioned to register with the passage of the pockets. As shown in Figs. 7 and 8, the cam disk which regulates these movements is provided with the three cam surfaces 43, 44 and 45, best shown in Fig. 7 of different lengths at varying distances from the center of the disk, and by regulating the position of the dog 39 with respect to the center of the cam plate the frequency of movement of the dog can be given three variations. With every actuation of the mechanism by a trip wire the cam disk will be given one complete revolution, and during this revolution the dropper plate will be moved a distance sufficient to bring four pockets successively into register with the discharge opening. While the dog rests upon the depressed or thin portion 42 of the cam disk near the margin thereof, the slide plate will be held in position to open the discharge outlet during the passage of three pockets thereover, after which the dog will ride up onto the elevated marginal portion 45 of the cam surface, which movement of the dog throws the slide plate into position to close the outlet for the passage of the fourth pocket. It will be noted that on the marginal portion of the cam the elevated surface constitutes about one-fourth of the total surface, whereby the actuation will be the ratio of one closed pocket to three open pockets. Where it is desired to drop two kernels of grain, the dog is moved into position to contact the intermediate portion 44 of the cam disk, at which point the elevated and depressed surfaces are about equal in length. With this adjustment the cut-off plate will open to permit the discharge from two pockets and close the cut-off discharge of the two succeeding pockets.

With the dog in the position to contact the inner cam surfaces 43, at which point the depression is about three times as long as the elevation, one kernel of grain will be discharged and three cut off. In this manner it is possible to regulate the machine to feed a charge of one, two or three kernels to the valve mechanism for every actuation thereof, without dissembling the machine and without the substitution of parts that are necessary in certain prior constructions.

What I claim as new and desire to secure by Letters Patent is:

1. In a corn planter, the combination of a dropper plate provided at its periphery with pockets, a cut-off slide adapted to control the discharge from the pockets, means for revolving the dropper plate, and means adapted to be adjusted to different positions for moving the cut-off slide at varying degrees of frequency, substantially as described.

2. In a corn planter, the combination of a dropper plate provided at its periphery with pockets, a cut-off slide adapted to control the discharge from the pockets, means for revolving the dropper plate, a cam disk provided with a plurality of cam surfaces of different lengths, a member adapted to be brought into engagement with any one of the cam surfaces, and means actuated by the movements of said member for imparting movements of varying frequency to the cut-off slide, substantially as described.

3. In a corn planter, the combination of a rotatably mounted dropper plate provided around its periphery with pockets, a discharge passage adapted to receive the grain carried by the pockets, a cut-off slide regulating the discharge through said passage, a shaft, gearing on the shaft, and gearing connected with the dropper plate for imparting rotation to the latter, a cam disk carried by the shaft and provided with a plurality of cam surfaces of different lengths at varying distances from the center of the disk, a dog adapted to engage any one of said surfaces, and connections between the dog and the cut-off slide for regulating the predetermined movement of the latter, substantially as described.

4. In a corn planter, the combination of a rotatably mounted dropper plate provided around its periphery with pockets, a discharge passage adapted to receive the grain carried by the pockets, a cut-off slide regulating the discharge through said passage, a shaft, gearing on the shaft and a gearing connected with the dropper plate and in mesh with the gearing on the shaft, for imparting rotation to the dropper plate, a cam disk carried by and rotatable with the shaft and provided on its face with a plurality of cam surfaces of different lengths at varying distances from the center of the disk, a dog adapted to be moved toward and from the center of the disk and adapted to engage with any one of said surfaces, and connections between the dog and the cut-off slide for regulating the movement of the latter, substantially as described.

FRANK P. MURPHEY.

Witnesses:
SAMUEL W. BANNING,
PIERSON W. BANNING.